Jan. 25, 1966   O. J. B. ORWIN   3,230,897

CONVEYORS FOR CONVEYING GOODS

Filed Oct. 25, 1963   3 Sheets-Sheet 1

INVENTOR
OLAF JOHN BARCLAY ORWIN
By Kurt Kelman
agent

Jan. 25, 1966   O. J. B. ORWIN   3,230,897
CONVEYORS FOR CONVEYING GOODS
Filed Oct. 25, 1963   3 Sheets-Sheet 2
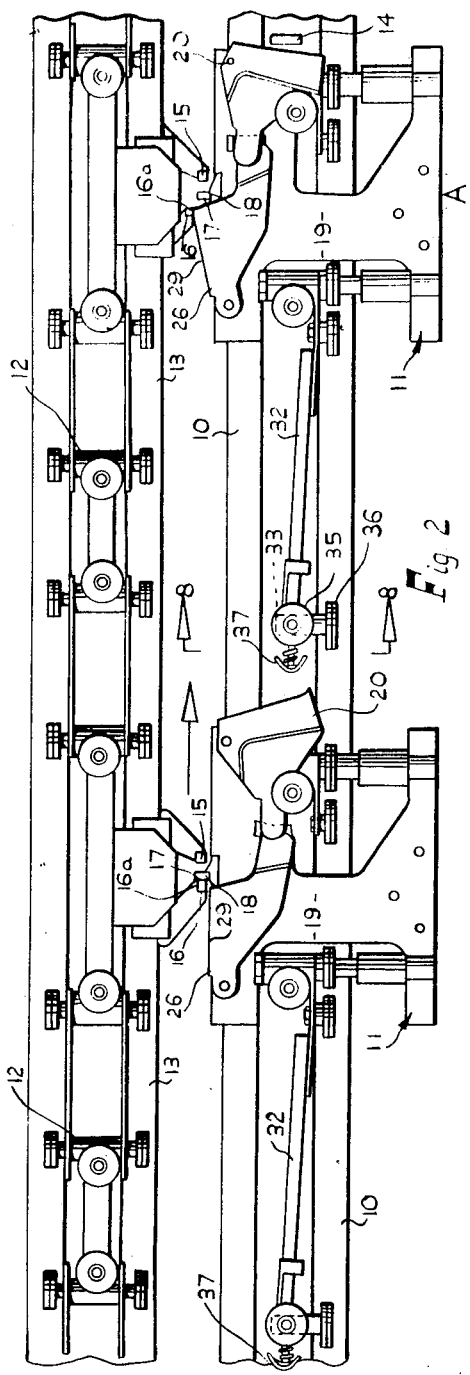
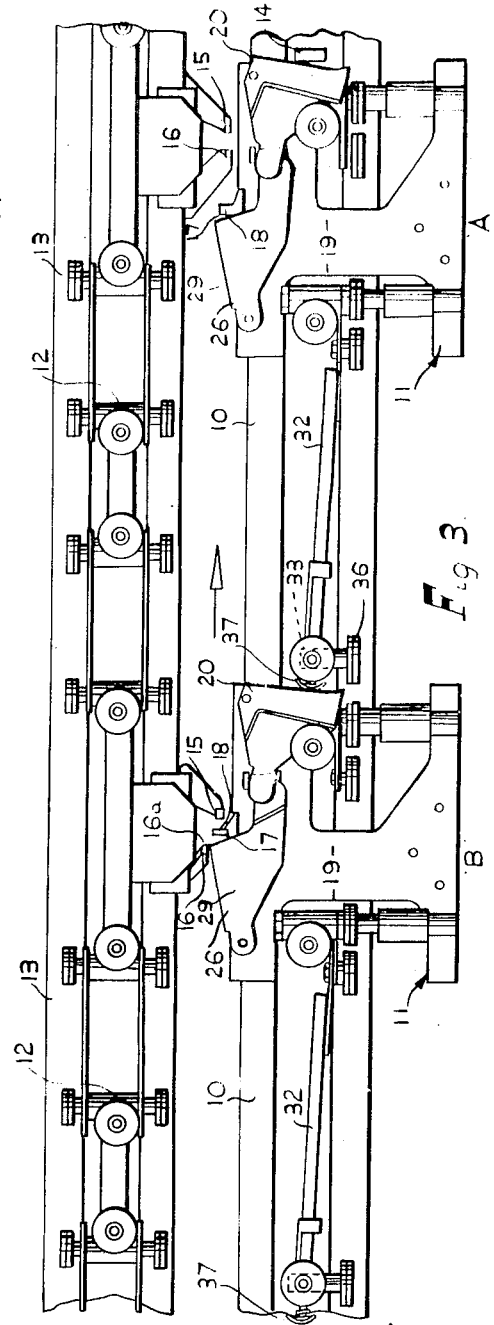
INVENTOR.
OLAF JOHN BARCLAY ORWIN
BY Kurt Kelman
agent Jan. 25, 1966  O. J. B. ORWIN  3,230,897
CONVEYORS FOR CONVEYING GOODS
Filed Oct. 25, 1963  3 Sheets-Sheet 3

INVENTOR.
OLAF JOHN BARCLAY ORWIN
By Kurt Kelman
agent

United States Patent Office 3,230,897
Patented Jan. 25, 1966

3,230,897
CONVEYORS FOR CONVEYING GOODS
Olaf John Barclay Orwin, Quinton, Birmingham, England, assignor to Fisher & Ludlow Limited, Tipton, England, a British company
Filed Oct. 25, 1963, Ser. No. 318,900
7 Claims. (Cl. 104—172)

This invention relates to conveyors for conveying goods, comprising a trolley track, a plurality of wheeled goods supporting trolleys advanceable along the trolley track, a conveyor element disposed adjacent to the trolley track and provided at intervals along its length with driving dogs each adapted to engage with driving abutments mounted one on each trolley in fixed relation thereto so as to be adapted to advance the trolleys along the trolley track, and means adapted to displace the conveyor element driving dogs relative to the conveyor element from a trolley driving to a trolley disengaged position in respect of each of a number of successively advancing trolleys so as to permit of a number of trolleys being brought to rest one behind the other in spaced apart relationship at some predetermined location on the trolley track.

At present it is the customary practice to effect disengagement of the drive to a succession of advancing trolleys by providing the trolley track with a plurality of drive disengaging elements spaced apart along the length of the track, each connected by mechanical or other means to an associated trolley engaging actuating element situated forwardly in the direction of trolley advancement relative to the drive disengaging element, the arrangement being such that as a trolley engages each actuating element, the associated drive disengaging element is operated to displace into the disengaged position that particular driving dog which is advancing the next successively following or second trolley, such disengagement of the drive to the second trolley being maintained until the first trolley has advanced from said previously engaged actuating element.

The foregoing existing arrangement is open to the objection that it is relatively expensive and lacks flexibility, in that the number of trolleys which can be brought to rest in the manner above described at a predetermined location or locations along the length of the trolley track is dependent upon the number of drive disengaging elements and associated actuating elements provided at such particular location.

The present invention has for its object the provision of an alternative arrangement which avoids the necessity to provide a series of drive disengaging elements with their associated actuating elements and mechanical or other connecting means therebetween, which alternative arrangement is of a robust nature and is not likely to fail under service conditions.

A further object of the present invention is the provision of an improved arrangement in which, when the second of two successive trolleys is arrested as a result of engagement with a part of the first trolley, such arresting operation is not affected by the natural tendency for a loaded trolley when first arrested to oscillate to a limited extent backwards and forwards relative to the trolley track.

In a conveyor according to the present invention, each trolley is provided with a dog displacing member movable between an inoperative position and an operative position in which it is adapted to move the conveyor element driving dogs into their trolley disengaged position, each trolley having mounted thereon a striker member displaceable relative to the associated trolley and disposed at the forward end of the associated trolley so as to be adapted to engage with a rear part of a preceding trolley. Suitable means connects said two members of each trolley together so that, when the striker member engages with any obstruction such as a rear part of a preceding trolley, it moves the dog displacing member into its operative position, each trolley having mounted thereon a spacer element so disposed as to extend between the striker member of each trolley and the preceding trolley on the trolley track. The arrangement is such that, when the second trolley of the two successively advancing trolleys approaches within a predetermined distance of the preceding trolley, the preceding trolley provides an abutment to effect displacement of the striker member of the second trolley and thus moves the dog displacing member of the second trolley into its operative position and disengages the drive to the second trolley.

In the present specification the expressions "front" and "forward," "rear" and "rearward" have reference to the designed direction of advancement of the trolleys along the trolley track.

With such an arrangement the presence of the spacer element serves to prevent the second of two successively advancing trolley moving closer to the first or preceding trolley than a minimum distance which is predetermined by the length of the spacer element, and by suitably selecting this length in accordance with the type and size of load which is to be carried by the several trolleys it is possible effectively to prevent collision or other undesirable impact between the loads of successively advancing trolleys.

It is within the scope of the invention in its broadest form that the striker member and the dog displacing member should be integral with one another, i.e. connected integrally together as by forming them each as one arm of a two armed lever element embodying an arm connecting portion intermediate the two arms the lever. Preferably however the two members are separate from each other.

Preferably each driving dog is adapted to be displaced in a generally upward direction from its trolley driving to its trolley disengaged position and in such an arrangement the dog displacing member would constitute a dog lifting member having an upwardly directed dog engaging face which, with the dog lifting member in its operative position, slopes downwardly in a direction rearwardly of the direction of advancement of the trolleys, so that with the dog lifting member in its operative position and the associated trolley at rest, successively advancing dogs on the conveyor element are maintained out of engagement with the driving abutment of the arrested trolley. To facilitate the lifting of the driving dogs, these may be mounted and constructed in accordance with the invention disclosed and claimed in applicant's copending application No. 318,901, filed concurrently herewith.

The invention is illustrated in the accompanying drawings wherein,

FIGURE 2 is a side elevation to an enlarged scale of part of the conveyor depicted in FIGURE 1 and showing two successively advancing trolleys with the parts in position for transmitting drive to the second of these two advancing trolleys which are advancing in the direction indicated by the arrow in this figure.

FIGURE 3 is a view similar to FIGURE 2 but showing the position of the parts with the drive to the second or following trolley disconnected.

Figure 1:
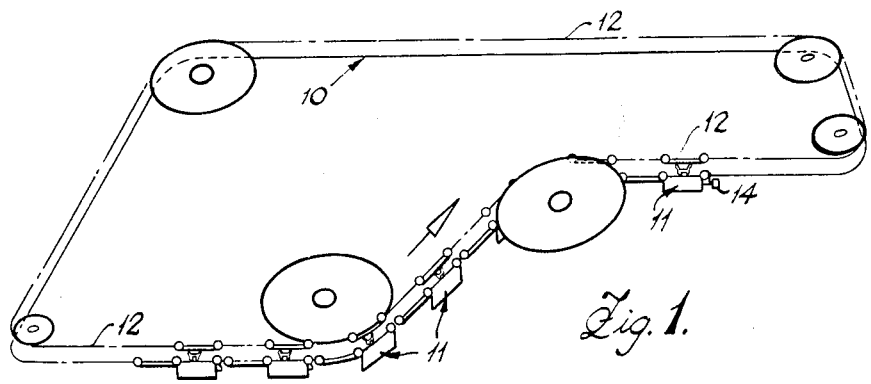
FIGURE 1 is a perspective view of one form of conveyor of the kind specified embodying one form of the present invention.

Referring to the drawings, the conveyor there illustrated comprises a trolley track 10, a plurality of wheeled trolleys 11 advanceable along the track, a conveyor element in the form of an endless chain 12 supported from a second or chain track 13, which with the conveyor chain 12 is disposed adjacent to and above the trolley track 10. In such an arrangement at each location where it is desired to arrest the first of a succession of advancing trolleys there would be provided some form of drive disengaging element 14, see FIGURE 1, which in the known manner is under the control of the operator.

The conveyor chain 12 is provided at intervals along its length with pairs of dependent dogs 15, 16, the foremost dog in each pair constituting a retarding dog 15, and the rearmost constituting a driving dog 16, and these may each be constructed and mounted as described in the aforementioned application No. 318,901 so that each driving dog 16 depends downwardly from its associated conveyor chain 12 so as normally to be in a lower trolley driving position (see FIGURE 2) in which a forwardly directed substantially vertical driving face 16a on the lower end of the dog 16 is adapted to engage a driving abutment 17 constituted by a rearwardly directed face of a substantially T-shaped abutment bar 18 attached rigidly to the body 19 intermediate the two ends of the trolley. This trolley body 19 is formed as a plate disposed in a vertical plane which extends in a direction of advancement of the trolleys along the trolley track 10.

Each driving dog 16 is capable of being lifted from the trolley position depicted in FIGURE 2 in respect of the second of the two successively advancing trolleys, into a raised trolley disengaged position as depicted in FIGURE 3 in respect of such trolley, in which position the driving dog 16 is raised clear of the previously engaged trolley driving abutment 17.

Figure 9:
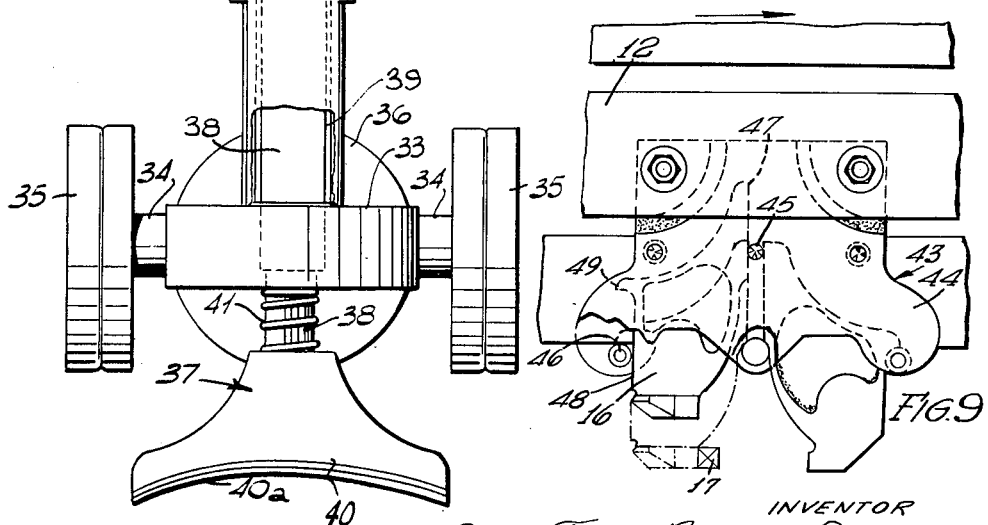
FIGURE 9 is a part-sectional view to an enlarged scale of part of the conveyor depicted in FIGURE 2 and showing the manner in which each driving dog is mounted for movement relative to the powered driving element of the conveyor.

As shown in FIGURE 9 and as described more particularly in the application aforementioned, means are provided for mounting each driving dog 16 for vertical movement relative to the conveyor chain 12 between a lower trolley driving position depicted in chain line outline in FIGURE 9 and an upper drive disengaged positioned depicted in full outline in such figure in which the driving dog is out of engagement with the trolley driving abutment 17. Such means comprise mounting each driving dog 16 within a housing 43 carried by the conveyor chain 12 to depend therefrom, each housing comprising a pair of parallel vertical spaced apart plates 44 connected together by a plurality of pins including pins 45, 46 disposed respectively adjacent forwardly and rearwardly directed vertically extending plane faces 47, 48, formed on the correspondingly directed sides of the dog 16. These vertical faces 47, 48 of dog 16 are accordingly adapted for vertical sliding engagement with pins 45, 46 to provide for the aforementioned vertical movement of the dog 16 relative to the conveyor chain 12. Downward movement of the dog 16 relative to housing 43 is limited by providing it adjacent rear face 48 with a rearwardly directed portion 49 which with the dog in the lower position depicted in FIGURE 9 abuts against the upper side of adjacent pin 46.

Figure 4:
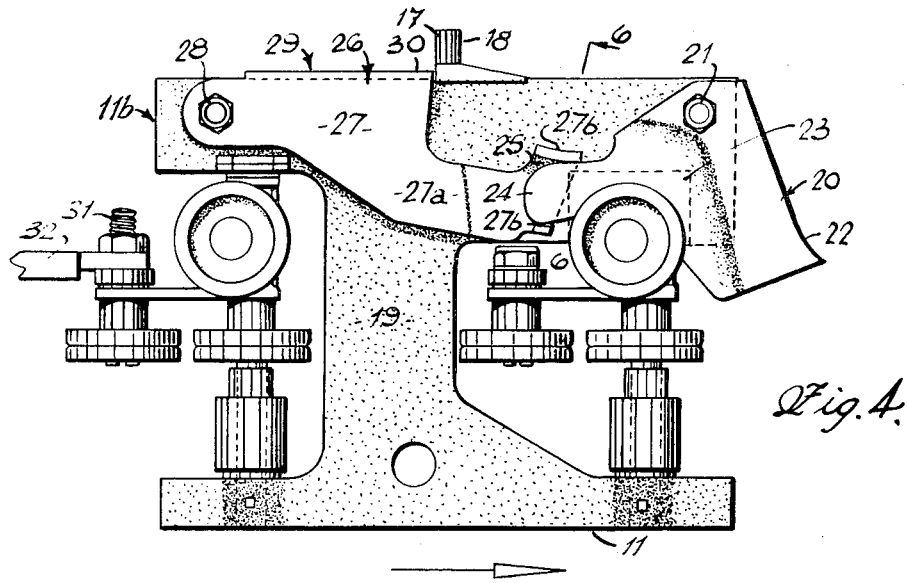
FIGURE 4 is a side elevation to an enlarged scale of one of the trolleys depicted in FIGURES 2 and 3.
Figure 5:
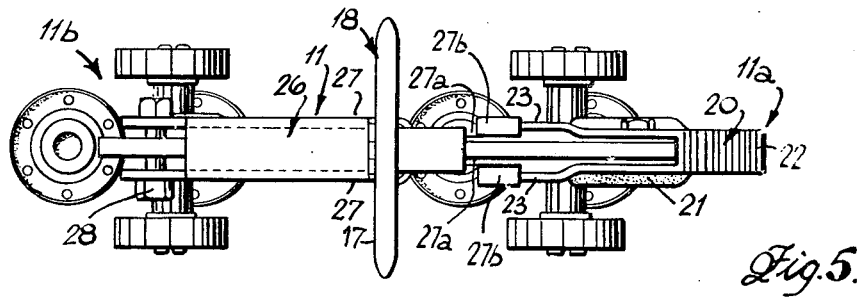
FIGURE 5 is a plan view of the trolley depicted in FIGURE 4.
Figure 6:
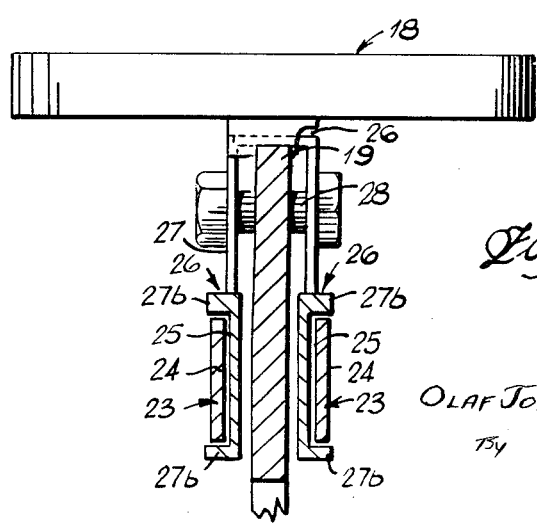
FIGURE 6 is a sectional view of a detail on the line 6—6 of FIGURE 4.

As shown most clearly in FIGURES 4 and 5, each trolley 11 is provided with a striker member 20 substantially in the form of a bell crank lever pivoted at 21 about a horizontal transverse axis to the forward end 11a of the trolley body 19 adjacent the upper edge thereof. One of the two parts of this striker member lever depends from the pivot 21 thereof and constitutes a striking arm 22 of channel form in cross-section with the open side thereof directed downwardly and rearwardly of the associated trolley 11.

The other part of this striker member lever is constituted by a pair of arms 23 which are constituted by rearwardly directed extensions of the channel sides of the striking arm 22. Each of these arms 23 is formed as its rear end with a nose 24 which works within a forwardly directed recess 25 provided at the front end of a dog lifting member 26 at a position somewhat forwardly of the trolley abutment bar 18.

As shown in FIGURES 4 and 5, this dog lifting member 26 is of inverted channel form in cross-section with the sides 27 extending on opposite sides of the plate-like trolley body 19, each of these dog lifting member sides 27 being formed with a forwardly directed extension 27a which at its forward end is formed with a pair of vertically spaced transversely outwardly extending flanges 27b which constitutes the aforementioned recess 25 with the nose 24 of each arm 23 working between the two flanges 27b at each side of the trolley body 19.

The dog lifting member 26 at its rear extremity is pivoted at 28 about a horizontal transverse axis to the trolley body 19 adjacent the rear end 11b of the associated trolley. The dog lifting member 26 at the part thereof situated rearwardly of the abutment bar 18 has an upwardly directed driving dog engaging face 29 conveniently provided by the connecting portion 30 of the channel section dog lifting member.

The arrangement is such that as shown in FIGURE 4, the dog lifting member 26 under its own weight normally occupies a lowered position in which its connecting portion 30 abuts against the upper edge of the trolley body 19, in which position the striking arm 22 projects forwardly as well as downwardly from its pivot 21, and in the event of the striking arm meeting an obstruction, it is swung rearwardly relative to the associated trolley, raising the dog lifting member 26 so that, as shown in FIGURE 3, its upwardly directed dog engaging face 29 is raised above the upper side of the adjacent T-shaped abutment bar 18, thereby raising clear of such bar the conveyor chain driving dog 16 previously in engagement with such bar to disconnect the drive to the associated trolley and thus bring the same to rest.

In this raised position, depicted in FIGURE 3, the upper face 29 of each dog lifting member 26 slopes upwardly in a forward direction so that with the trolley arrested and the dog lifting member in this raised position, successively advancing driving dogs 16 advancing in the direction of the arrow in FIGURE 3, are lifted by their engagement with the upwardly sloping face 29. Thus the dogs 16 are caused to ride over the abutment bar 18 of the arrested trolley without transmitting drive thereto, while as soon as the striking arm 22 is freed the dog lifting member returns under its own weight to its lower or inoperative position, in which the advancing dogs 16 are no longer raised.

Each trolley body 19 at a position adjacent the rear end 11b of the trolley, has pivotally connected thereto about a vertically extending pivot 31, a spacer element 32 conveniently described herein as "a tail element" which extends rearwardly from the associated trolley and is constructed as a rigid metal bar or tube. The rear end of each tail element 32 carries, as shown in FIGURE 7, a bearing block 33 conveniently of circular form, which carries a spindle 34 mounting a pair of transversely aligned rollers 35 which rotate about a horizontal axis, as well as a dependent roller 36 which rotates about a vertical axis.

Figure 8:
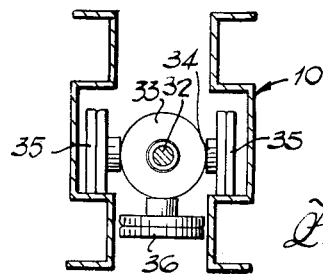
FIGURE 8 is a sectional view to an enlarged scale on the line 8—8 of FIGURE 2.

As best shown in FIGURE 8, these rollers 35 and 36 engage with corresponding portions of the trolley track 10 which as shown in this figure, is of cruciform cross-section so that the rear end of the tail element 32 is effectively supported and guided at a predetermined height and transverse location to the trolley track.

Each tail element 32 is made of a length such as to maintain successive trolleys when arrested spaced relatively apart by a minimum distance sufficient to preclude contact between the goods thereby carried, for example, goods on suspension hooks which tend to swing relative to the associated arrested trolley.

Figure 7:
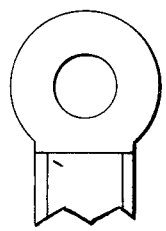
FIGURE 7 is a plan view to an enlarged scale of one of the spacer elements provided on each of the trolleys as depicted in FIGURES 2 and 3.

Slidable longitudinally within the circular block 33 at the rear end of each tail element 32 is a spring loaded stop element 37 consisting, as best shown in FIGURE 7, of a rod 38 slidable in the direction of trolley advancement within both the aforementioned block 33 and a bore 39 formed in the rear end portion of the tail element 32, so that the stop element 37 is free to slide substantially in the direction of advancement of the trolleys.

The rear end of stop element bar 38 is provided with a buffer 40 having a rearwardly directed abutment face 40a adapted to engage with the forward end of striker member 20 adjacent the free end of its associated trolley 11. The stop element 37 is spring loaded by means of a helically coiled compression spring 41 mounted on the rod 38 and working between the adjacent end of buffer 40 and the adjacent face of block 33.

The arrangement is such that when, as shown in FIGURES 2 and 3, the aforemost of two successively advancing trolleys is arrested, the buffer 40 of the stop element 37 at the rear of the tail element of such arrested trolley is adapted to engage with the striker member 20 of the next successively advancing trolley so as to displace such striker member in a rearward and upward direction relative to the associated trolley from the inoperative position depicted in FIGURE 2 to the operative position depicted in FIGURE 3 and in so doing, to raise the associated dog lifting member 26, thereby lifting clear of abutment bar 18 the dog 16 previously in driving engagement with such bar, thereby disconnecting the drive to the second or following trolley.

When the striker member 20 of the following trolley, the drive to which is disconnected, first engages buffer 40 of the spring loaded stop element, it is necessarily being subjected to a force acting opposite to the direction of advancement of the so engaged trolley, i.e. such trolley is now subjected to an impact resisting its further forward movement and in consequence the so arrested trolley is liable to rebound in a rearward direction just as a loaded railway truck rebounds when it strikes the buffers of a preceding stationary truck.

Such tendency for the arrested trolley to rebound is particularly marked if, as is frequently the case, the load is in the known manner carried on suspension hooks depending beneath the trolley body 19 with the load being free to oscillate relative to the trolley in a fore and aft direction, i.e. parallel to the direction of trolley advancement.

Such rebounding movement of the arrested trolley would, in the event of the buffer 40 being rigid in relation to the preceding trolley, have the effect of allowing the striker member 20 of the following trolley to swing rearwardly in relation to its associated trolley towards its inoperative position, thus permitting of the dog lifting member 26 of such following trolley returning gravitationally towards its inoperative position.

The effect of this would be liable to permit of the abutment bar 18 of the second trolley being undesirably engaged by the next successively advancing conveyor chain driving dog 16 or might even have the effect of returning the lifting member 26 to its inoperative position before it had been raised sufficiently to fully disengage the driving dog previously in driving engagement with the second or following trolley. In these undesirable circumstances, the second trolley would be subjected to the advancing force exerted by the conveyor chain, which advancement is still being resisted by the presence of the preceding trolley and damage to the conveyor system might thereby occur.

The aforementioned undesirable results are avoided by mounting the stop element 37 for fore and aft movement in relation to its associated tail element, i.e. in relation to the trolley on which it is carried, which fore and aft movement is under the control of spring 41.

This spring 41 is made of sufficient strength as to ensure that when the striker member 20 of the following trolley first engages the buffer 40 of the preceding trolley, the buffer is only displaced slightly in a forward direction relative to the preceding trolley and the striker member of the following trolley is displaced rearwardly in relation to such trolley so as to raise the dog lifting member 26 on the following trolley and effect immediate disengagement of the drive in the manner already described. Thus the spring 41 is made of sufficient strength merely to retain the dog lifting member 26 of the following trolley lifted into its operative position, i.e. the spring 41 is required merely to counterbalance that part of the weight of the members 20 and 26 which is applied to buffer 40.

In operation the second trolley will continue to advance under its momentum and as soon as the striker member 20 has moved rearwardly and upwardly to the maximum extent relative to its associated second trolley, the above referred to forward movement of the second trolley will now have the effect of substantially compressing spring 41 on the tail element of the preceding trolley so as thereby to absorb momentum possessed by the second trolley.

When the spring 41 is fully compressed, i.e. the buffer 40 of the preceding trolley has moved forwardly to the maximum extent relative to the preceding trolley, the second trolley will now commence as above described to rebound but as in so doing it moves rearwardly relative to the first trolley, the spring 41 thereof extends to maintain through its associated buffer 40 pressure on the striker member 20 of the second trolley which accordingly remains in the operative position depicted in FIGURE 3 with the associated dog lifting member 26 still raised to preclude transmission of drive to the second trolley.

The permissible travel in a fore and aft direction of stop element 37 of each tail element 32 and the overall compression movement of each spring 41 is made great enough to take care of the aforementioned rebound movement on an arrested trolley, while the spring 41 is made sufficiently light in action as to permit of the spring being fully compressed without the spring being made so light as to be incapable of exerting the required pressure on the striker member 20 to retain this in its operative position.

The stop element 37 of each trolley in fact constitutes a rear part thereof adapted to engage with the striker member 20 of a following trolley so as to displace this into the operative or drive disengaging position as well as to maintain the drive to such following trolley disengaged despite the fore and aft or rebound movement of the following trolley when first arrested.

The slidable rod 38 of each stop element 37 is provided as shown in FIGURE 7, with a detent 42 which serves to limit the rearward movement of the stop element relative to its associated tail element, i.e. serves to prevent the stop element becoming detached from its associated tail element, thus each stop element has limited fore and aft movement in relation to the trolley on which it is mounted.

The mode of operation of a conveyor constructed as above described will be appreciated from the foregoing description and it will be readily understood in operation the striker member 20 of the first of a number of successively advancing trolleys may be displaced into its operative position by engagement with an abutment 14 which may be projected by the operator into the path of the striker member 20 so as to raise the corresponding trolley driving dog 16 relative to the conveyor chain 12 in the manner already described, thus bringing to rest the foremost of a number of successively advancing trolleys in the position marked A in FIGURES 2 and 3. The next successively advancing trolley which as shown in FIGURE 2 is being advanced in the direction of the arrow towards the trolley already arrested at position A, will itself now be arrested when its striker member 20 engages with the rear end of the tail element 32 of the already arrested preceding trolley so as thereby, as shown in FIGURE 3 to displace the striker member 20 and dog lifting member 26 connected thereto into the operative position depicted in FIGURE 3 in which the dog 26 driving the second trolley is raised clear of the trolley abutment bar to thus bring to rest the second trolley at the position marked B in FIGURE 3.

Such second arrested trolley by means of its associated tail element 32 extending rearwardly therefrom may serve similarly to arrest the next successively advancing trolley and with the above described arrangement it will be appreciated that there is no limit to the number of trolleys which may be arrested one behind the other at the predetermined location, so that the arrangement is extremely flexible and can readily be adapted to meet the particular requirements of the user.

What I claim then is:

1. A conveyor comprising a plurality of trolleys, a driving abutment on each trolley, a supporting track, a powered driving element arranged above the track, a number of dependent driving dogs carried on the driving element, each trolley being propelled along the track by engagement of its driving abutment with a respective one of the driving dogs, means for disconnecting the driving dog from the driving abutment on a respective one of the trolleys, said means comprising
    (a) means mounting each driving dog for movement relative to the driving element between a lower trolley driving position and an upper drive disengaged position in which the dog is out of engagement with the trolley driving abutment,
    (b) means mounting each driving abutment in fixed relation to its associated trolley,
    (c) a dog lifting member mounted on each trolley for movement in relation thereto between a lower inoperative position and a raised drive disengaging position in which it is adapted to lift the trolley driving dog out of engagement with the trolley driving abutment,
    (d) a striker member mounted movably on that part of each trolley which is foremost in the direction of trolley advancement,
    (e) means connecting said two members of each trolley together so that, when the striker member engages with any obstruction, it moves the dog lifting member into its dog lifting position, and
    (f) a spacer element mounted on each trolley in a position to extend between two successively advancing trolleys to effect displacement of the striker member of the rearmost of the two advancing trolleys into a position for raising the associated dog lifting member into its drive disengaging position.

2. The conveyor according to claim 1, wherein each trolley comprises a body in the form of a vertically disposed plate having an upper substantially horizontally extending edge with the plane of the plate parallel to the direction of advancement of the trolley, each dog lifting member and striker member being respectively of channel form so as to embody a web and a pair of arms which arms extend on opposite sides of said plate, means pivoting the pair of arms of each of said members to the plate, each channel shaped dog lifting member being inverted and pivotal relative to the trolley body between a lower position in which the web of the inverted channel shaped dog lifting member is horizontal and rests on the upper edge of the body and a raised position in which the web slopes downwardly in a direction rearwardly of the direction of advancement of the trolley so that, with the dog lifting member in its operative position and the associated trolley at rest, successively advancing dogs on the driving element are maintained out of engagement with the driving abutment of the arrested trolley.

3. The conveyor according to claim 2, wherein each of the arms of the inverted channel shaped dog lifting member is provided with forwardly extending portions each having a recess, a nose on the rear end of each of the two arms of the striker member, each nose engaging pivotally within one of said dog lifting member recesses in such a manner as to permit the striker member and dog lifting member to move relatively when the dog lifting member is displaced from one to the other of these two positions.

4. A conveyor comprising a plurality of trolleys, a driving abutment on each trolley, a supporting track, a powered driving element arranged above the track, a number of dependent driving dogs carried on the powered driving element, each trolley being propelled along the track by engagement of its driving abutment with a respective one of the driving dogs, means for disconnecting the driving dog from the driving abutment on a respective one of the trolleys, said means comprising
    (a) means mounting each driving dog for movement relative to the driving element between a lower trolley driving position and an upper drive disengaged position in which the dog is out of engagement with the trolley driving abutment,
    (b) means mounting each driving abutment in fixed relation to its associated trolley,
    (c) a dog lifting member mounted on each trolley for movement in relation thereto between a lower inoperative position and a raised drive disengaging position in which it is adapted to lift the trolley driving dog out of engagement with the trolley driving abutment,
    (d) a striker member mounted movably on that part of each trolley which is foremost in the direction of trolley advancement,
    (e) means connecting said two members of each trolley together so that when the striker member engages with any obstruction, it moves the dog lifting member into its dog lifting position,
    (f) a spacer element mounted on each trolley in a position to extend between two successively advancing trolleys to effect displacement of the striker member of the rearmost of the two advancing trolleys into a position for raising the associated dog lifting member into its drive disengaging position,
    (g) a buffer element mounted on each trolley in a position for transmitting dog lifting movement between a spacer element on one trolley and a striker element on a second trolley,
    (h) means mounting said buffer element for limited fore and aft movement relative to the trolley on which it is mounted, and
    (i) spring loaded means controlling said fore and aft movement acting to displace said buffer element in a direction away from the trolley on which it is mounted.

5. The conveyor according to claim 4 wherein each spacer element extends rearwardly from its associated trolley, and each buffer element is mounted on the rear end of a spacer element for fore and aft movement in relation thereto, each buffer element being engageable with the striker member of a following advancing trolley.

6. The conveyor according to claim 5, further comprising a rod having a rear end and mounted for sliding movement in a fore and aft direction relative to the rear end portion of the associated spacer element, each buffer element being carried on the rear end of a respective one of said rods, and a spring loaded element acting between the buffer element and the associated spacer element to displace the buffer element in a direction away from the spacer element.

7. The conveyor according to claim 4 wherein each trolley comprises a body in the form of a vertically disposed plate having an upper substantially horizontally extending edge with the plane of the plate parallel to the direction of advancement of the trolley, each dog lifting member and striker member being respectively of channel form so as to embody a web and a pair of arms which arms extend on opposite sides of said plate, means pivoting the pair of arms of each of said members to the plate, each channel shaped dog lifting member being inverted and pivotal relative to the trolley body between a lower position in which the web of the inverted channel shaped dog lifting member is horizontal and rests on the upper edge of the body and a raised position in which the web slopes downwardly in a direction rearwardly of the direction of advancement of the trolley so that, with the dog lifting member in its operative position and the associated trolley at rest, successively advancing dogs on the driving element are maintained out of engagement with the driving abutment of the arrested trolley.

References Cited by the Examiner

UNITED STATES PATENTS

| | | | |
|---|---|---|---|
| 2,619,916 | 12/1952 | Rainier | 104—172 |
| 2,885,969 | 5/1959 | Kay et al. | 104—172 |
| 3,044,416 | 7/1962 | Reibel et al. | 104—172 |

FOREIGN PATENTS

| | | |
|---|---|---|
| 1,201,830 | 7/1959 | France. |
| 910,682 | 11/1962 | Great Britain. |

ARTHUR L. LA POINT, *Primary Examiner.*

MILTON BUCHLER, *Examiner.*

F. W. MONAGHAN, *Assistant Examiner.*